(12) United States Patent
Choi

(10) Patent No.: US 8,279,271 B2
(45) Date of Patent: Oct. 2, 2012

(54) SINGLE CHANNEL STEREOSCOPIC MONITOR

(76) Inventor: Hae-Yong Choi, Seoul (KR)

( * ) Notice: Subject to any disclaimer, the term of this patent is extended or adjusted under 35 U.S.C. 154(b) by 1408 days.

(21) Appl. No.: 11/521,404

(22) Filed: Sep. 15, 2006

(65) Prior Publication Data

US 2007/0070191 A1    Mar. 29, 2007

(30) Foreign Application Priority Data

Sep. 27, 2005 (KR) .......................... 10-2005-0091228

(51) Int. Cl.
*H04N 15/00* (2006.01)
(52) U.S. Cl. ......................................................... 348/58
(58) Field of Classification Search .................. 348/58, 348/51; 375/462, 485, 487, 240.01–240.29
See application file for complete search history.

(56) References Cited

U.S. PATENT DOCUMENTS

| | | | | |
|---|---|---|---|---|
| 5,007,715 A | * | 4/1991 | Verhulst | 349/15 |
| 5,260,773 A | * | 11/1993 | Dischert | 348/42 |
| 5,541,641 A | * | 7/1996 | Shimada | 348/58 |
| 5,880,883 A | * | 3/1999 | Sudo | 359/462 |
| 7,057,637 B2 | * | 6/2006 | White | 348/14.16 |

\* cited by examiner

*Primary Examiner* — David Czekaj
*Assistant Examiner* — Tracy Li
(74) *Attorney, Agent, or Firm* — Bacon & Thomas, PLLC

(57) ABSTRACT

A single channel stereoscopic monitor receives a stereoscopic TV image and an Internet stereoscopic image. Left and right eye images are simultaneously received to display the stereoscopic image by a monitor or a TV through a single channel, are polarized by polarizing plates having left and right deflection angles symmetrical to each other, and are automatically combined into a single stereoscopic image by a reflecting mirror and a half mirror, so that a viewer can watch the stereoscopic image.

3 Claims, 5 Drawing Sheets

SINGLE CHANNEL STEREOSCOPIC MONITOR

BACKGROUND OF THE INVENTION

1. Field of the Invention

The present invention relates to a stereoscopic TV and a stereoscopic monitor for receiving a digital image transmitted through Internet and a stereoscopic broadcasting signal transmitted from broadcasting station and for displaying the same in the form of a stereoscopic image, and more particularly, to a single channel stereoscopic monitor in which the existing broadcasting station transmits the stereoscopic broadcasting signal without additional equipment and a user can watch the stereoscopic broadcasting program without additional device.

2. Description of the Related Art

Conventional stereoscopic TV and monitor, as shown in FIG. 6, display a left eye image a and a right eye image b, that are taken by two cameras, that is, a left camera 7a and a right camera 7b, on a left TV 2a and a right TV 2b through separated two channels. In order to transmit the left eye image a and the right eye image b, since two channels of a left eye image broadcasting device 8a and a right eye image broadcasting device 8b are required, two broadcasting systems are required and this requirement is identical to a broadcasting system of a digital image through Internet.

Moreover, since the left and right eye images a and b transmitted through the two channels must be synchronized, an expensive synchronizing device 9 such a synchronizer is required.

Since an apparatus is required to combine the left and right eye images to be displayed on the left and right TVs 2a and 2b or on the left and right monitors into one stereoscopic image, it is very difficult to display the stereoscopic image on a TV or a monitor of a computer in practice.

Recently, in order to solve the problem, the left and right eye images are transmitted from a TV broadcasting station or an Internet server through a single channel with time difference, and a TV or a monitor receives the transmitted images. However, in this case, polarized glasses having a device for transmitting the left and right eye images in sequence must be used. The left and right eye images must be displayed at the same time by a synchronizing signal transmitted from the TV broadcasting station or the server. Since the sequential time of the left and right eye images does not match the time of transmitting the left and right eye images of the polarized glasses due to the a difference between a long distance and a short distance, a difference of broadcasting signals, and so on, the stereoscopic broadcasting cannot be achieved because of disappearance of the stereoscopic aspect of the image and the suffering of viewer's eyes.

SUMMARY OF THE INVENTION

Therefore, the present invention has been made in view of the above and/or other problems, and it is an object of the present invention to provide a single channel stereoscopic TV and a single channel stereoscopic monitor, in which a stereoscopic image is transmitted from a broadcasting station without additional device, a TV receives the transmitted stereoscopic image such that a viewer can watch the stereoscopic image displayed on the TV wherein the stereoscopic image can be viewed using a single TV, a right eye image and a left eye image can be steadily transmitted without additional synchronizing device or a left and right sequential opening and closing device, received left and right eye images are automatically polarized and combined with each other so that clear stereoscopic image can be easily viewed.

It is other object of the present invention to provide a TV for selectively displaying a general image and a stereoscopic image, for dividing the general image into a left eye image and a right eye image to increase stereoscopic aspect of the images, and for displaying a part of or whole image to be displayed on a monitor in the form of a stereoscopic image such that an image provided through the Internet can be displayed as a stereoscopic image.

BRIEF DESCRIPTION OF THE DRAWINGS

These and/or other aspects and advantages of the present invention will become apparent and more readily appreciated from the following description of the embodiments, taken in conjunction with the accompanying drawings, in which:

FIG. 4b is a sectional view of the monitor in FIG. 4a;

DESCRIPTION OF THE PREFERRED EMBODIMENTS

Figure 1:
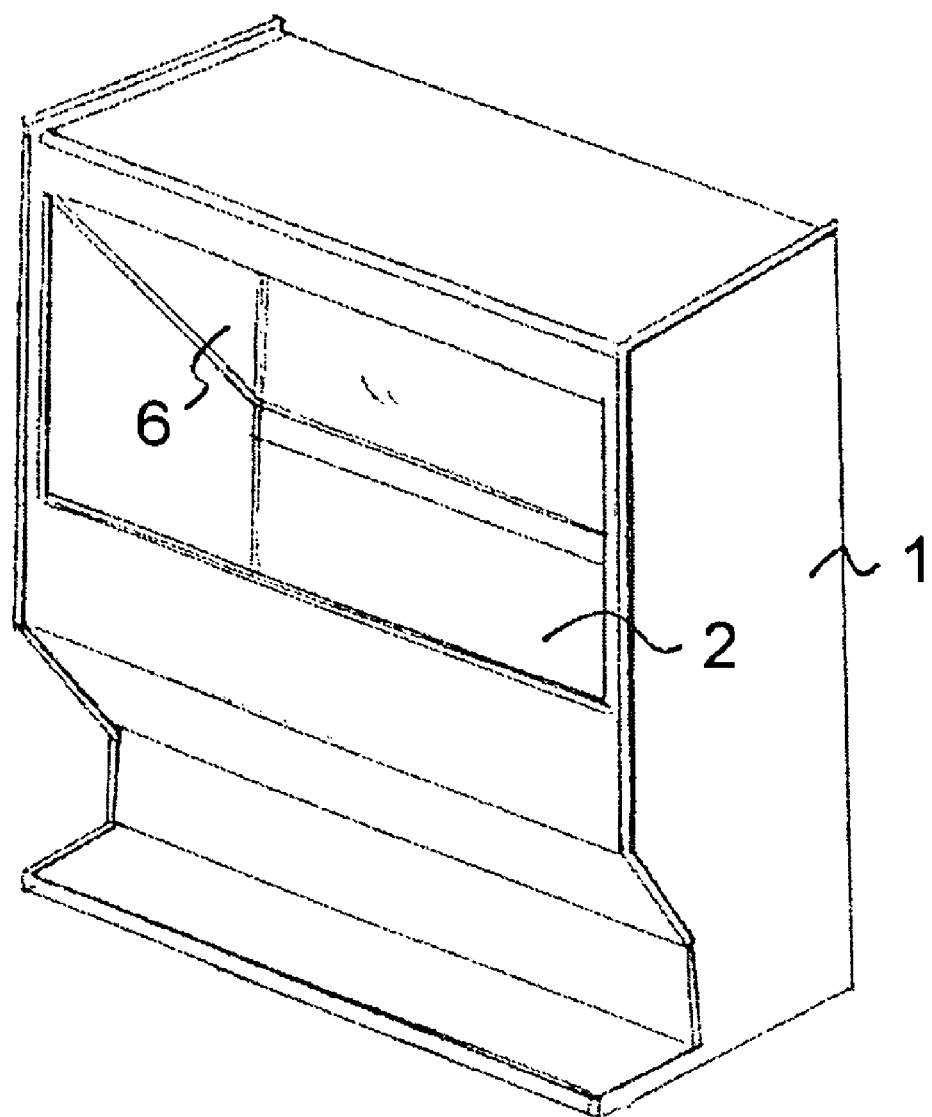
FIG. 1 is a view illustrating a single channel stereoscopic monitor according to an embodiment of the present invention.
Figure 2:
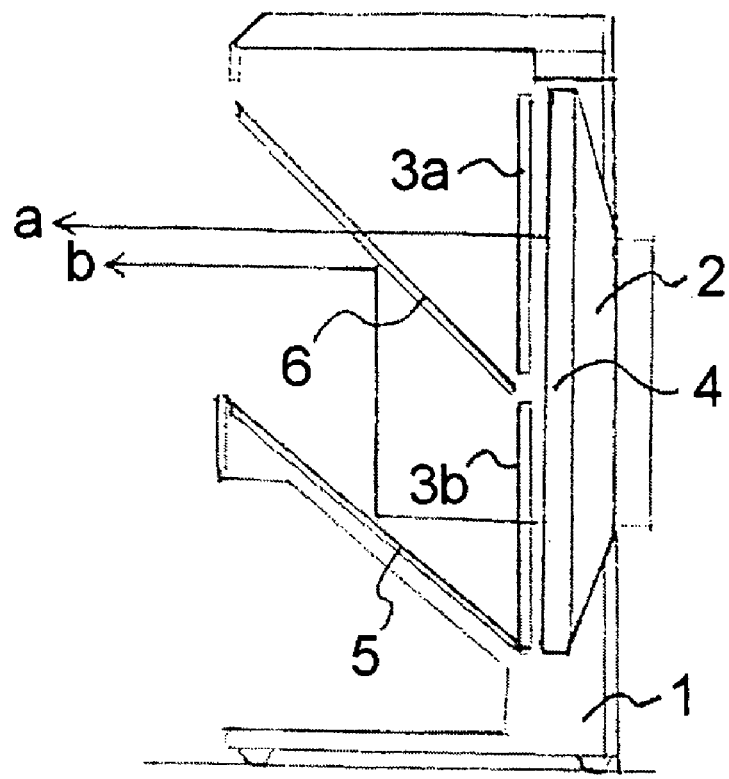
FIG. 2 is a sectional view illustrating the single channel stereoscopic monitor according to the embodiment of the present invention in FIG. 1.
Figure 3:
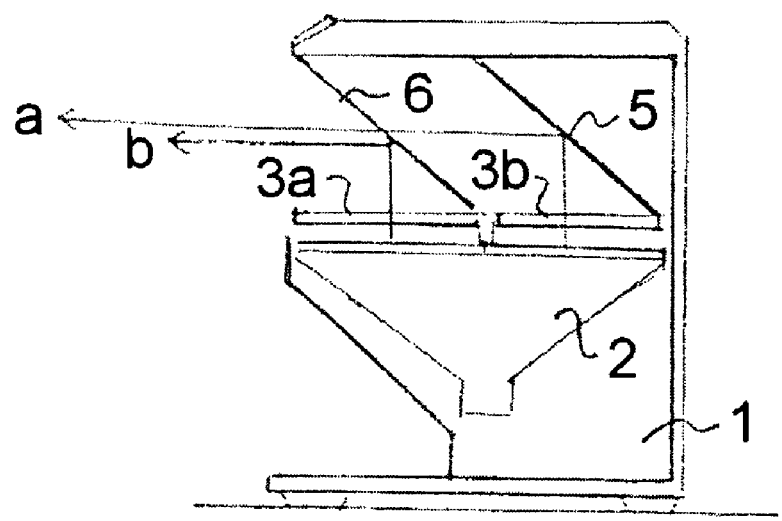
FIG. 3 is a sectional view illustrating a single channel stereoscopic monitor according to another embodiment of the present invention.

In a single channel stereoscopic monitor according to an embodiment of the present invention, as shown in FIGS. 1, 2, and 3, a TV 2 such as a CRT TV, a liquid crystal display (LCD) TV, a plasma display panel (PDP) TV, a projection TV, or the like is installed at a rear side of a main body case 1 in the vertical direction as shown in FIG. 2 or in the horizontal direction as shown in FIG. 3, a screen is divided into an upper screen and a lower screen such that a left polarizing plate 3a is installed in front of the upper screen 2a and a right polarizing plate 3b is installed in front of the lower screen 2b wherein the polarizing direction of the left and right polarizing plates 3a and 3b are symmetric in the horizontal direction, i.e., the polarized left and right images are projected symmetrically in the same transmittal direction.

In front of the right polarizing plate 3b, a reflecting mirror 5 is installed at an angle and a half mirror 6 is installed at the same angle as that of the reflecting mirror 5 in front of the left polarizing plate 3a.

The half mirror 6 is preferably a half mirror 6 having a 50% reflection and a 50% transmission function of transmitting an incident light of 45 degrees by 50% and of reflecting an incident light of a right angle by 50%, and has a transmission and reflection ratio of 65% to 35%.

As such, the reflecting mirror 5 and the half mirror 6 are installed at the same angle in the same direction so that the left eye image a is displayed at the lower side of a multi-screen 2c and reflected to enter the half mirror 6 at the oblique angle and to be reflected forward and the right eye image b is directly transmitted. Thus, the right and left eye images a and b entering the multi-screen 2c are combined into a single image on a single screen of the TV.

Although the left and right eye images a and b are received by the single TV in the form of a divided screen referred to as the multi-screen, the left and right eye images a and b are automatically combined by the above-mentioned structure.

When the positions of the left and right eye images a and b and the positions of the reflecting mirror 5 and the half mirror 6 may be exchanged, the result is same.

Figure 4A:
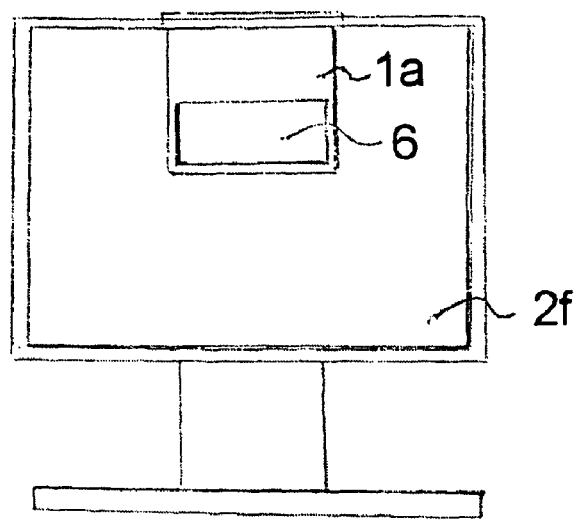
FIG. 4a is a view illustrating a monitor for displaying a stereoscopic image.
Figure 4B:
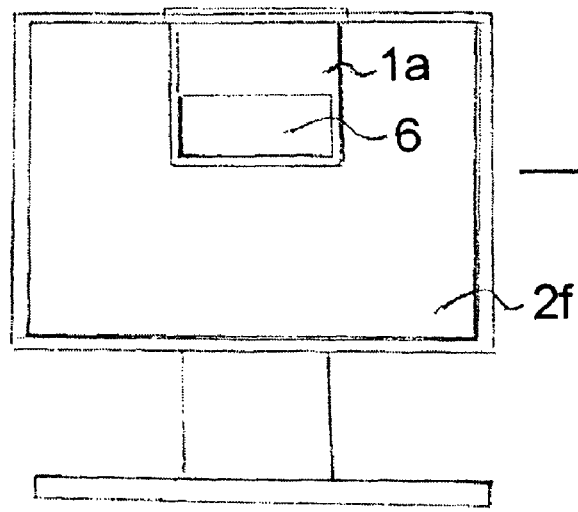
Figure 4B:
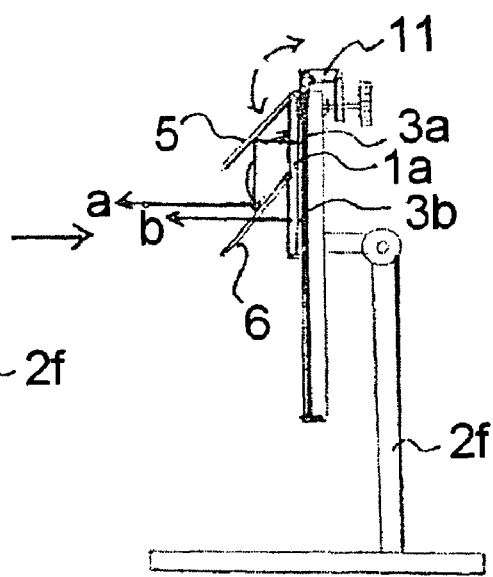
Figure 5:
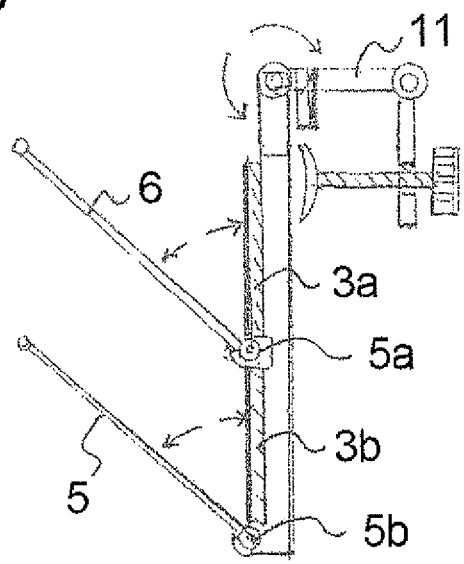
FIG. 5 is a sectional view illustrating a single channel stereoscopic monitor according to still another embodiment of the present invention.
Figure 6:
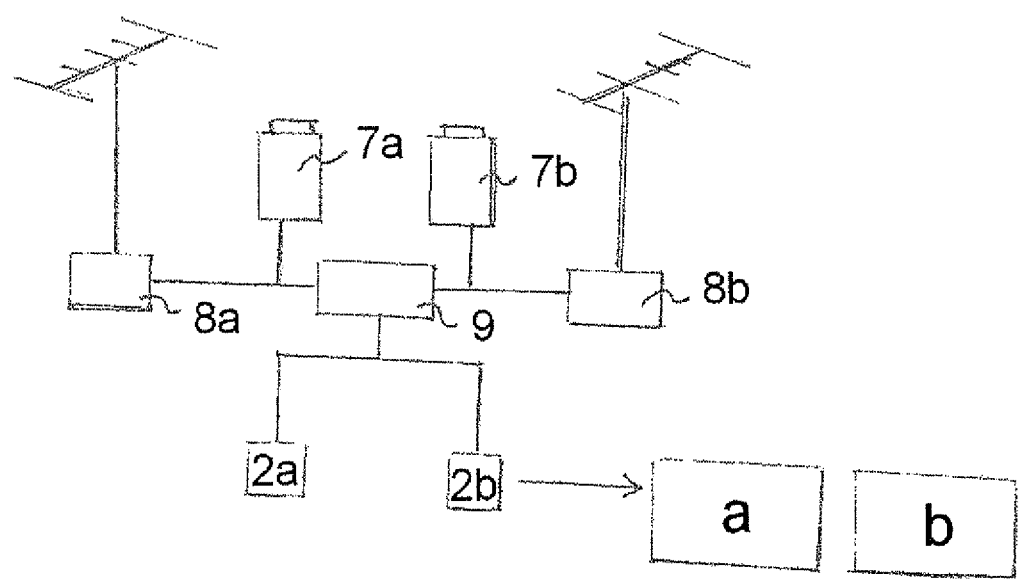
FIG. 6 is a view illustrating a conventional broadcasting system for transmitting a stereoscopic image.

As shown in FIGS. 4a, 4b, and 5, the left eye image a and the right eye image b are displayed on whole area or a part of a computer monitor 2f by dividing the whole area or the part of the monitor 2f vertically (or horizontally), and the reflecting mirror 5 and the half mirror 6 and the left and right polarizing plates 3a and 3b are installed in front of the left and right eye images a and b such that their angles are adjusted by angle adjustors 5a and 5b.

A support 11 is coupled with the rear side of the above-mentioned structure by a hinge in the form of an adaptor to be pivoted and to support the monitor 2f so that the support 11 can be coupled with and separated from the monitor 2f or the TV 2.

According to the structure as shown in FIG. 5, the structure is coupled with the monitor 2f to be positioned in front of the left and right eye images a and b to watch the stereoscopic image through the monitor 2f. When the structure is pivoted upwardly, a general image of the monitor can be viewed. When the structure is separated from the monitor 2f and the reflecting mirror 5 and the half mirror 6 are folded to carry in the form of a thin film.

Needless to say, in the single channel stereoscopic monitor of the present invention, the image can be divided into the upper image and the lower image or the left eye image and the right eye image and the results are same.

Figure 7:
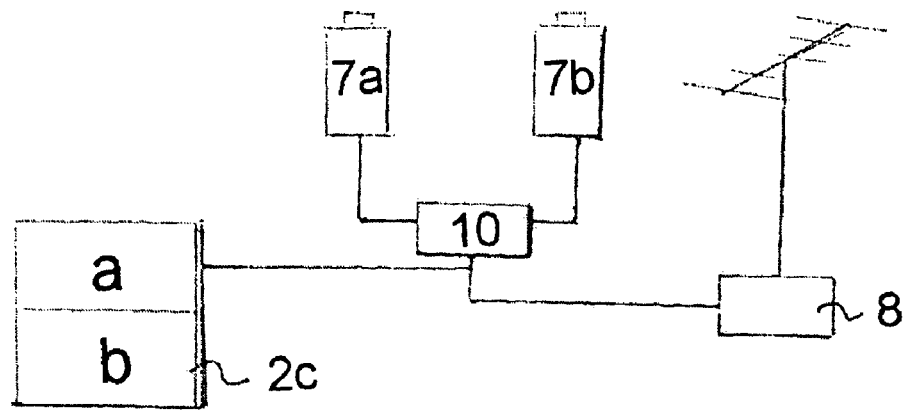
FIG. 7 is a view illustrating a broadcasting system for transmitting a stereoscopic image, employed in the present invention.
Figure 8:
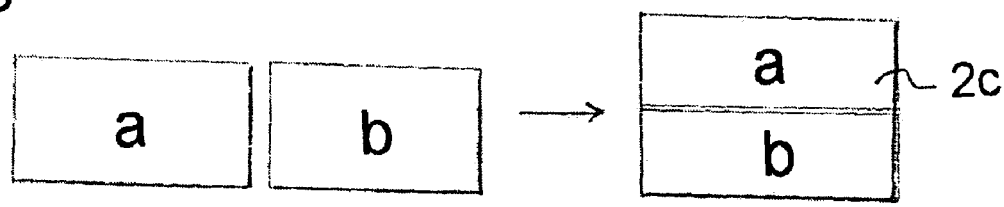
FIG. 8 is a view illustrating the comparison of the broadcasting systems shown in FIGS. 6 and 7.

As shown in FIG. 7, a well-known image editor 10 edits the images of a left camera 7a and a right camera 7b to be displayed as the upper and lower images (or the left and right eye images) on a single screen of a TV 2 and to form the multi-screen 2c having a single unit image displayed on the screen of the TV 2.

The multi-screen 2c is edited and recorded in a DVD, a HDD, or the like, or can be broadcasted through a single channel in real time.

The multi-screen 2c is divided into the upper and lower images (or the left and right eye images) on the single TV as shown in FIGS. 2 and 3 by the broadcasting system or the recording device so that the left eye image a is displayed on the upper side of the screen of the TV 2 and the right eye image b is displayed on the lower side of the screen of the TV 2.

The left eye image a displayed on the upper side of the screen of the TV 2 is converted into a left-polarized image by the left polarizing plate 3a installed in front thereof, is reflected by the reflecting mirror 5 in front thereof, and is reflected forward by the half mirror 6 installed at the upper side thereof.

The right eye image b displayed on the lower side is converted into a right-polarized image by the right polarizing plate 3b installed in front thereof, is transmitted to the half mirror 6 in front thereof, and is reflected forward.

Thus, a viewer can view a stereoscopic image by which the left-polarized left eye image a is combined with the right-polarized right eye image b by the half mirror 6 such that the left eye image a enters a left eye lens of polarized glasses and the right eye image b enters a right eye lens of the polarized glasses.

Moreover, since identical general images are displayed on the left side and the right side of the TV and are combined with each other by the same way as described above, the viewer can view the general broadcasting image without the polarized glasses.

Figure 9:
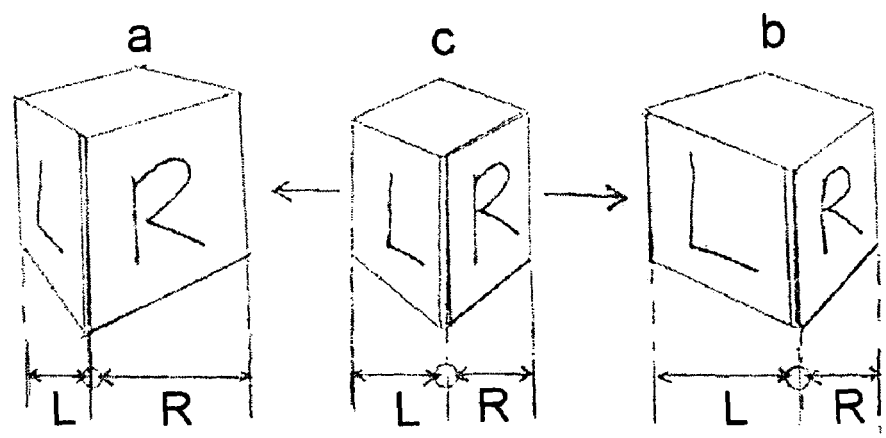
FIG. 9 is a view illustrating an application of the present invention.

However, as shown in FIG. 9, a general image c is displayed on the upper screen 2a and the lower screen 2b simultaneously. The left eye image a is distorted at an image angle viewed by a left eye and the right eye image b is distorted at an image angle viewed by a right eye by the TV or an image editing program such that the stereoscopic aspect of the displayed imaged is increased by two or more times.

The left and right eye images may be exchanged by the upper and lower images to be transmitted. The screen of the TV 2 may be divided into the upper and lower screens or the left and right screens and the divided results are identical.

As described above, according to the present invention, the conventional stereoscopic image that is implemented by two TVs 2a and 2b is implemented as the left and right eye images are displayed on the two multi-screens 2c of the single TV 2 so that the stereoscopic images can be transmitted without adding a specific device to the existing broadcasting system. The left and right eye images that are received by the conventional left and right TVs 2a and 2b are edited into the multi-screens with the upper and lower screens (or the left and right screens) of the single TV 2 and are deflected at a symmetrical angle by the left and right polarizing plates 3a and 3b to be automatically combined into a single stereoscopic image by the reflecting mirror 5 and the half mirror 6. Thus, the stereoscopic image can be viewed without additional image synchronizing device, polarized glasses with right and left shutters, or right and left eye image opening and closing signals.

Moreover, the stereoscopic TV and monitor of the present invention allows the viewer to watch the general image such as a public broadcasting image and a cable broadcasting image as it is and to watch the general TV image and the stereoscopic TV image simultaneously.

According to the present invention, the general TV image is formed into the left eye image a entering the left eye and the right eye image b entering the right eye as the scanning direction is distorted by the TV so that the left and right eye images can be watched as the stereoscopic image with the left and right polarizing plates 3a and 3b, the reflecting mirror 5, and the half mirror 6.

In this case, the stereoscopic aspect of the general TV image is weaker than that of the stereoscopic image whose left and right eye images are separately made, but is two or more times better than the general TV image.

Moreover, as shown in FIGS. 4a and 5, when the adaptor 1a is coupled with the monitor 2f, the left and right eye images a and b are transmitted together with the general Internet image through a single Internet line so that a specific product or a specific picture can be provided as a stereoscopic image and the general image can be watched as it is simultaneously.

In other words, since a specific portion of an image or overall image can be displayed as a stereoscopic image as needed, the single channel stereoscopic monitor of the present invention allows watching of the stereoscopic image and the general image.

Therefore, the single channel stereoscopic monitor of the present invention can be applied to a stereoscopic TV, a stereoscopic monitor, a stereoscopic DVD, a stereoscopic sports relay, a stereoscopic game device, a stereoscopic Internet, and the like.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A stereoscopic optical monitor adaptor for use with a stereo monitor having a first and second display displaying on respective areas of the monitor a left and right eye image, said stereoscopic optical monitor adaptor detachably mountable in front of the monitor and comprising:

first and second polarizing plates configured so that the first and second polarizing plates are arranged to be installed in front of, respectively, the first area and a the second area of the monitor; and a reflecting mirror and a half mirror which are both pivotally connected to the stereoscopic optical monitor adaptor, wherein the reflecting mirror and half mirror are configured to be positioned at an angle such that the right and left eye images are polarized symmetrically in the same transmittal direction by the first and second polarizing plates, and wherein one or both of the polarized left and right eye images are reflected by either or both the reflecting mirror and the half mirror to combine the reflected image with the other polarized left or right eye image into a single stereoscopic image.

2. The stereoscopic optical monitor adaptor according to claim 1, wherein the adaptor is coupled with the stereoscopic monitor such that the left and right eye images are displayed on left and right screens or on upper and lower screens through a single channel.

3. The stereoscopic optical monitor adaptor according to claim 1, further comprising a support coupled to a rear side of the stereoscopic optical monitor adaptor by a pivotable hinge, wherein the support is configured to couple and separate the stereoscopic optical monitor adaptor from the monitor.

* * * * *